United States Patent
George et al.

(10) Patent No.: US 9,454,355 B2
(45) Date of Patent: Sep. 27, 2016

(54) INFORMATION HANDLING SYSTEM IMAGE RESTORATION

(75) Inventors: Ashley George, Austin, TX (US); David Butler, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1508 days.

(21) Appl. No.: 12/836,663

(22) Filed: Jul. 15, 2010

(65) Prior Publication Data

US 2012/0017044 A1   Jan. 19, 2012

(51) Int. Cl.
G06F 9/445 (2006.01)

(52) U.S. Cl.
CPC . G06F 8/63 (2013.01); G06F 8/62 (2013.01); G06F 2212/205 (2013.01)

(58) Field of Classification Search
CPC ....... G06F 8/63; G06F 8/62; G06F 2212/205
USPC .................... 711/4, 100, 103, 115, 161, 162, 711/E12.022; 455/418–420
See application file for complete search history.

(56) References Cited

U.S. PATENT DOCUMENTS

| | | | |
|---|---|---|---|
| 7,725,674 B2 | 5/2010 | Thorsen | |
| 7,729,690 B1 * | 6/2010 | Huang et al. | 455/419 |
| 2005/0091073 A1 | 4/2005 | Harris | |
| 2007/0234000 A1 | 10/2007 | Gujarathi et al. | |
| 2008/0155683 A1 * | 6/2008 | Kim et al. | 726/21 |
| 2008/0310633 A1 * | 12/2008 | Brown et al. | 380/259 |
| 2010/0005262 A1 * | 1/2010 | Eri | 711/162 |
| 2010/0257145 A1 | 10/2010 | Felsheim | |

* cited by examiner

*Primary Examiner* — Zhuo Li
(74) *Attorney, Agent, or Firm* — Terrile, Cannatti, Chambers & Holland, LLP; Robert W. Holland

(57) ABSTRACT

An information handling system is returned to its original manufacture state with a tool stored on a detachable memory device that retrieves image restore information from non-volatile memory of the information handling system, cleanses information stored on the non-volatile memory and then returns the image restore information to the non-volatile memory. By executing an image restore tool that applies the image restore information, the original manufacture image is re-built in the non-volatile memory after the cleansing so that any personal information stored on the non-volatile memory by a previous user is erased.

19 Claims, 6 Drawing Sheets

INFORMATION HANDLING SYSTEM IMAGE RESTORATION

BACKGROUND OF THE INVENTION

1. Field of the Invention

The present invention relates in general to the field of information handling system images, and more particularly to an information handling system image restoration method and system that removes user data.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sold to end users in a variety of manners. One popular way for end users to purchase an information handling system is directly through the manufacturer. Often end users who purchase directly from a manufacturer order the information handling systems with built-to-order hardware and software configurations and have the ordered systems sent to the end user's home or business through a parcel service. Some end users, especially those who do not have much experience using or purchasing information handling systems, prefer to see and handle an information handling system in person before purchasing the system. One option available to such end users is to visit a retail store and interact with an information handling system in person before purchasing the information handling system. Once the end user selects a hardware configuration with the help of an employee of the retail store, the end user can purchase additional software and hardware that is installed with the help of the retail store employee. End users who are unfamiliar with information handling systems tend to reach a greater comfort level for the purchase of the information handling system after receiving advice from a retail store sales representative.

Although information handling systems are typically quite reliable, end users sometimes run into difficulties, such as when a component fails or when an end user does not know how to correctly interact with the information handling system. When an end user purchases an information handling system directly from the manufacturer, the end user typically obtains technical help by calling into the manufacturer and talking by phone with a manufacturer representative. If the representative is unable to address the end user concern or difficulty over the phone, the difficulty is typically addressed by having the end user ship the product back to the manufacturer for repair or replacement. When an end user purchases an information handling system from a retail store, an end user who runs into difficulty with the information handling system may elect to bring the information handling system back to the retail store for repair or replacement. Although a retail store representative can often address minor difficulties, such as misunderstandings by the end user about how the information handling system works, if a more serious difficulty exists the retail store representative generally does not have the time or expertise to address the difficulty. Instead, a retail store will typically exchange the information handling system for a new or refurbished system and investigate the difficulty after the end user leaves. If the difficulty is minor, the retail store will correct the difficulty, reload the original image on the information handling system and re-sell the information handling system as a refurbished system.

One difficulty with refurbishing an information handling system to sell to another end user is that some personal information from the previous end user may remain on the information handling system. When the information handling system is refurbished by a manufacturer, the manufacturer typically performs a bit level formatting of the hard disk drive to erase all data from the hard disk drive and then re-image the hard disk drive with a stored image of the system as originally configured. In some instances, retail stores lack the expertise or time to erase all data from the hard disk drive before re-imaging the hard disk drive, such as with a bit level formatting of the hard disk drive. For example, a PC Restore software utility loaded in a manufacturer partition of the hard disk drive will restore the hard disk drive to the original state from manufacture by re-imaging the hard disk drive with an image stored in the manufacturer partition, however, re-imaging the hard disk drive does not guarantee that information stored on the hard disk drive before the re-imaging will be erased after the re-imaging is complete.

SUMMARY OF THE INVENTION

Therefore a need has arisen for a system and method which re-images an information handling system hard disk drive and automatically ensures that the hard disk drive has all information erased.

In accordance with the present invention, a system and method are provided which substantially reduce the disadvantages and problems associated with previous methods and systems for re-imaging an information handling system hard disk drive. Image restoration information is retrieved from the information handling system to a detachable memory device and then the information handling system is cleansed of information. The image is restored to the information handling system with the image restoration information after cleansing so that the information handling system is restored to an original factory condition.

More specifically, an information handling system is manufactured from plural processing components and has an image copied to non-volatile memory, such as a hard disk drive, that includes an operating system and applications that an end user executes to create user data for storage on the non-volatile memory. A detachable memory device interfaces with the information handling system to cleanse the non-volatile memory of user data and re-image the non-volatile memory with the original factory image. An image of a manufacturer partition is created at the information handling system and copied from the information handling system to the detachable memory device. The manufacturer partition includes image restoration information such as an image of the information handling system has originally manufactured and an image restore tool that executes to restore the manufacture image to the hard disk drive. Then the information handling system non-volatile memory is cleansed, such as with a bit-by-bit format operation. The image of the manufacture partition, which includes the imager restoration information, is then copied from the detachable memory device to the information handling system over the cleansed hard disk drive and executed to restore the information handling system to its original factory condition.

The present invention provides a number of important technical advantages. One example of an important technical advantage is that an information handling system has a hard disk drive re-imaged automatically so that information stored on the hard disk drive before the re-imaging is erased from the re-imaged hard disk drive. A re-imaging tool stored on a mobile non-volatile device, such as a USB drive, automatically obtains an image for the information handling system, cleans the hard disk drive of the information handling system to erase all stored data, and then re-images the hard disk drive so that the information handling system is returned to its original manufacture condition without retaining any data stored after manufacture. The re-imaging tool leverages available imaging tools, such as PC Restore stored on a hard disk drive manufacturer partition, by copying the imaging tools to the non-volatile device so that the hard disk drive can be completely erased and then making the imaging tool available for re-imaging the hard disk drive, such as by copying the image of the manufacturer partition back to the hard disk drive with an application stored on the mobile non-volatile device. Automatically cleansing and re-imaging a hard disk drive from a detachable memory device provides a tool that a retail store can download and execute with little effort or difficulty to encourage safekeeping of end user personal data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A detachable memory device interfaces with an information handling system to load instructions that retrieve an image, cleanse and then return the information handling system to its original manufacture state. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
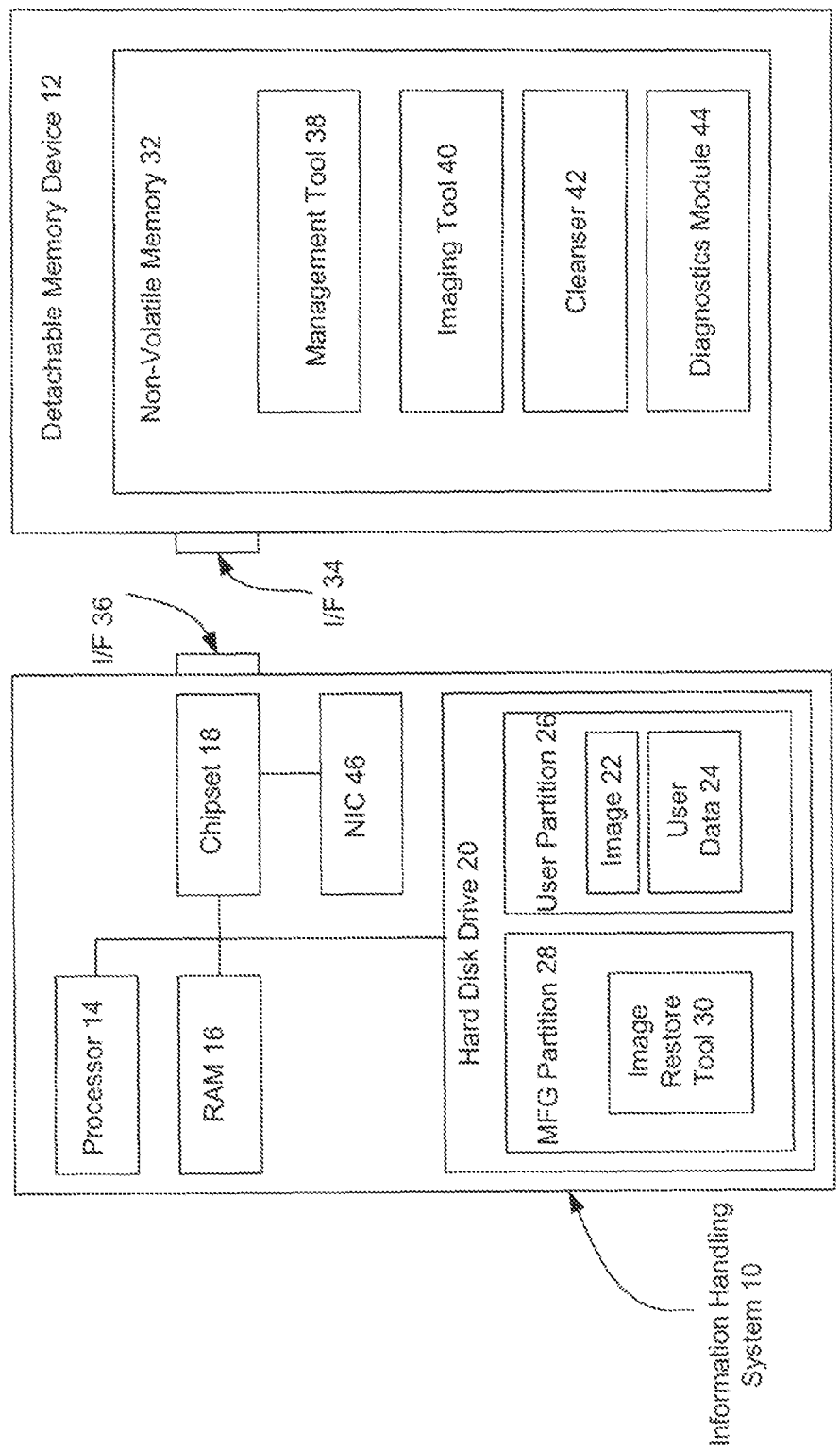
FIG. 1 depicts a block diagram of an information handling system and a detachable memory device having tools to cleanse the information handling system and then restore an image to the information handling system.

Referring now to FIG. 1, a block diagram depicts an information handling system 10 and a detachable memory device 12 having tools to cleanse information handling system 10 and then restore an image to the information handling system. Information handling system 10 is built from plural processing components that cooperate to process information, such as a processor 14 that processes information, RAM 16 that provides volatile memory to support processor operations and a chipset 18 that stores and executes firmware instructions, such as a BIOS. A hard disk drive 20 provides non-volatile memory that stores information during powered down states. During manufacture of information handling system 10, hard disk drive 20 is loaded with an image 22, such as an operating system and applications that are prepared to execute upon initial start-up of information handling system 10. After initial start-up, user data 24 is typically saved to hard disk drive 20 in the form of configuration information, passwords, documents and other user specific data. Often, the original image 22 and user data 24 are stored in a user partition 26 of hard disk drive 20, while a separate manufacturer partition 28 stores maintenance tools, such as an image restore tool 30. Image restore tool 30 is available for an end user to execute from hard disk drive 20 to restore image 22 to the original manufacture state. During manufacture, image restore tool 30 is loaded as a separate image from image 22 on hard disk drive 20 or in a common image with image 22. In alternative embodiments, hard disk drive 20 is a solid state drive or other type of storage device having non-volatile memory.

Although image restore tool 30 restores image 22 to the original manufacture state, running image restore tool 30 does not necessarily mean that user data 24 stored on hard disk drive 20 will be erased. In order to ensure that user data 24 is erased along with an image restoration, a detachable memory device 12 is used to execute image restore tool 30. Detachable memory device 12 has a non-volatile memory 32 and an interface 34 that allows interaction with an opposing interface 36 of information handling system 10. For example, detachable memory device 12 is a USB key that interfaces with a USB port of information handling system 10. Upon interfacing with information handling system 10, detachable memory device 12 provides a management tool 38 for execution on processor 14 that guides an end user through a cleanse and image restore process. First an imaging tool 40 executes on processor 14 to retrieve image restore tool 30 from hard disk drive 20 to detachable memory device 12 and to store image restore tool 30 on non-volatile memory 32 of detachable memory device 12. In one embodiment, imaging tool 40 creates an image of manufacture partition 28, which includes a copy of image 22 and image restore tool 30 to restore image 22 to user partition 26. In an alternative embodiment, only image 22 is copied from manufacture partition 28 while the tools to re-image hard disk drive 20 are maintained separately on detachable memory device 12. In one alternative embodiment, imaging tool 40 retrieves image restore tool 30 from an network location using a network interface card 46 of information handling system 10 based on a network location stored on information handling system 10. After image restore tool 30 is stored on detachable memory device 12, a cleanser 42 executes on processor 14 to cleanse hard disk drive 20 of all data stored on it, including user data 24, such as by performing a bit-by-bit format of hard disk drive 20. Once hard disk drive 20 is cleansed of all information, imaging tool 40 copies image restore tool 30 from detachable memory device 12 back to hard disk drive 20 and then erases image restore tool 30 from detachable memory device 12. For example, imaging tool 40 re-images manufacture partition 28 with the image previously created of the manufacture partition. After image restore tool 30 is copied back to information handling system 10, it is executed to restore image 22 to the original manufacture state. In one embodiment, the process of copying image restore tool 30 and cleansing hard disk drive 20 is managed automatically by management tool 38. After image 22 is restored, a diagnostics module 44 may be executed to ensure that information handling system 10 is in proper operational order.

Figure 2:
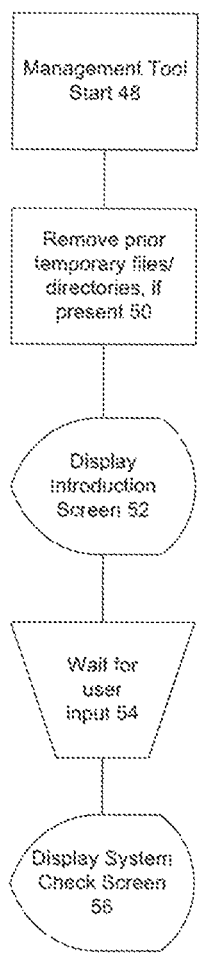
FIG. 2 depicts a flow diagram of a process for initiating imaging from a detachable memory device.

Referring now to FIG. 2, a flow diagram depicts a process for initiating imaging from a detachable memory device. At step 48, the management tool initiates, such as by automatically executing when the detachable memory device interfaces with the information handling system. At step 50, a check is made of the detachable memory device to remove any temporary files or directories, such as might be present from the restoration of a previous image at a different information handling system. At step 52, an introduction screen is presented at the information handling system to explain the upcoming process, such as to warn that a cleansing and re-imaging will delete all information on the information handling system. At step 54, a user input is awaited and received indicating to proceed and at step 56 a display system check screen is presented at the information handling system to let the end user know that checks are under way.

Figure 3:
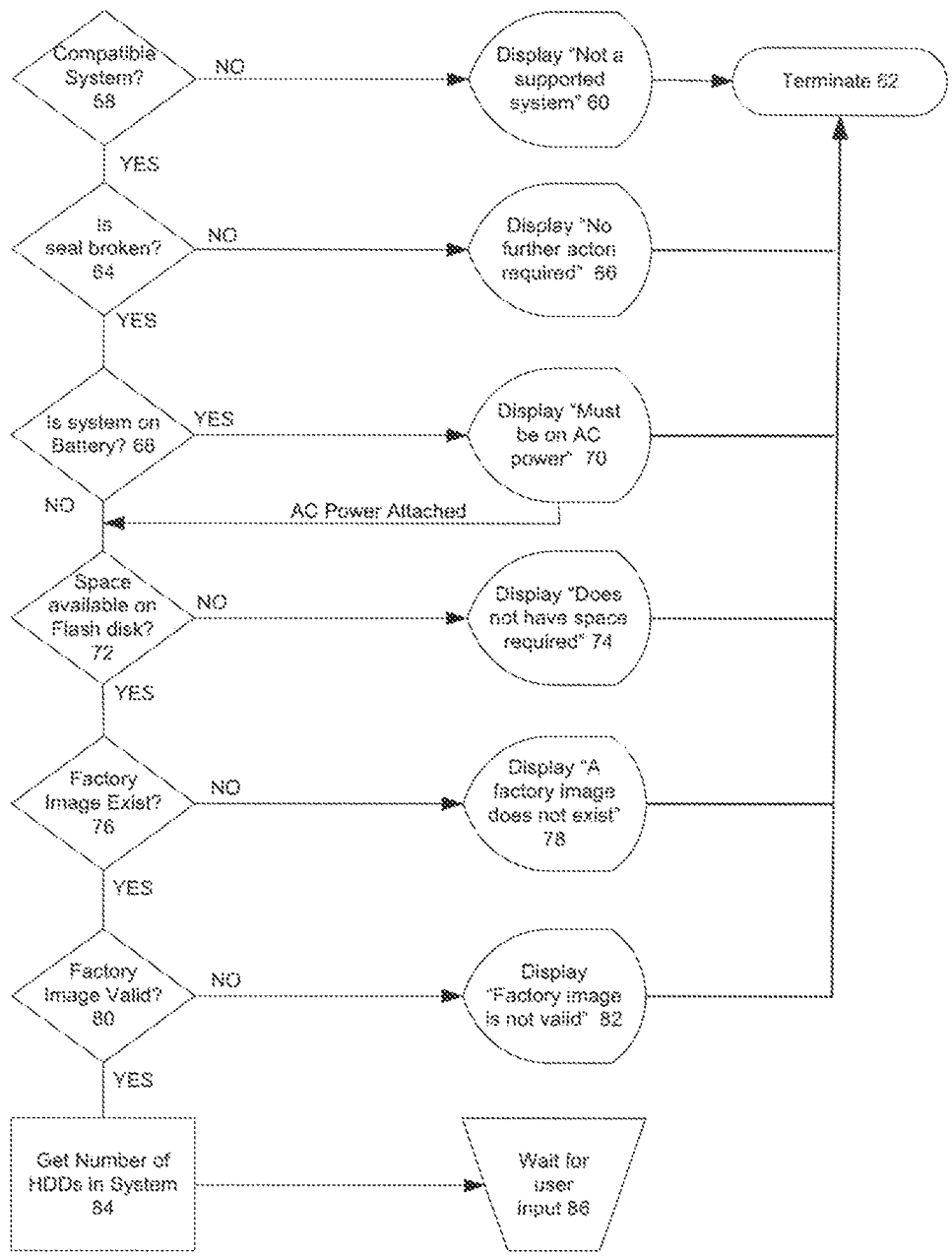
FIG. 3 depicts a flow diagram of a process for performing system checks before performing imaging from a detachable memory device.

Referring now to FIG. 3, a flow diagram depicts a process for performing system checks before performing imaging from a detachable memory device. The process begins at step 58 with a determination of whether the information handling system is compatible with re-imaging, such as by determining the manufacturer of the information handling system. If the information handling system is not compatible, the process continues to step 60 to display that the system is not compatible and step 62 to terminate. If the information handling system is compatible, the process continues to step 64 to determine if the "seal" of the system is broken. The "seal" is that point in the "out-of-box" experience of the user at which personal information of the user is saved to the information handling system. If the seal is not broken, the process continues to step 66 to display that the seal is not broken and then terminates at step 62 because if the seal is not broken and end user information is not saved to the system, then no need exists to re-image the system. If the seal is broken, the process continues to step 68 to determine if the information handling system is on battery power. If the system is on battery power, the process continues to step 70 to display a request for external power and to step 62 to terminate if external power is not provided in a predetermined time period, such as one minute. If the information handling system is on external power at step 68 or returned to external power at step 70, the process continues to step 72 to determine if adequate space exists on the detachable memory device to support re-imaging of the information handling system. If there is not adequate space, the process continues to step 74 to display that the available memory is not adequate and the process terminates at step 62. If the detachable memory device has enough memory at step 72, the process continues to step 76 to determine if a factory image exists on the information handling system hard disk drive. If a factory image is not available, such as an image restore tool in a manufacture partition, then the process continues to step 78 to display that a factory image is not available and the process terminates at step 62. If a factory image is available at step 76, a determination is made at step 78 of whether the image is valid at step 80. If the factory image is not valid, the process continues to step 82 to display that the factory image is not valid and the process terminates at step 62. If the factory image is valid at step 80, the process continues to step 84 to retrieve the number of hard disk drives of the information handling system so that each drive can be cleansed. At step 86, a display that checks are complete is made and the system waits for a user input to continue with the cleansing and re-imaging process.

Figure 4:
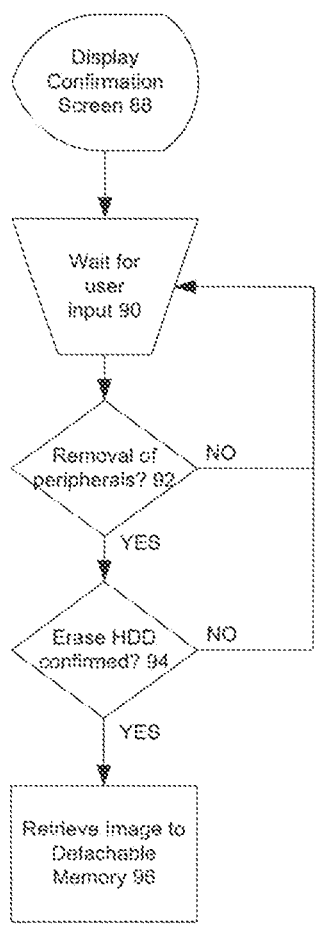
FIG. 4 depicts a flow diagram of user confirmations to cleanse non-volatile memory of an information handling system.

Referring now to FIG. 4, a flow diagram depicts user confirmations to cleanse non-volatile memory of an information handling system. The process begins at step 88 with display of a confirmation screen that the end user wants to re-image the hard disk drive with the original manufacture image. At step 90, the process waits until confirmation is received and then continues to step 92 to confirm the removal all peripheral devices from the information handling system. If peripherals remain interfaced with the information handling system, the process returns to step 90. If no peripherals are interfaced with the information handling system, the process continues to step 94 to confirm that the user wants the hard disk drive erased of all user information. If the user fails to confirm the erasing of user information, the process returns to step 90. Once the user confirms the erasing of all user information, the process continues to step 96 to initiate a cleanse and re-imaging of the information handling system hard disk drive.

Figure 5:
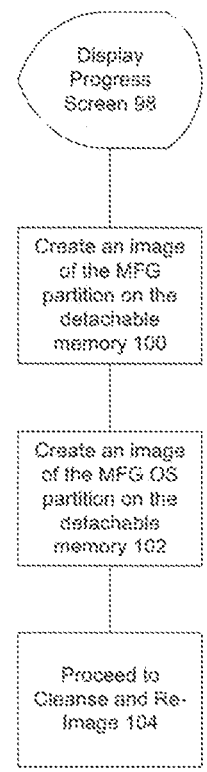
FIG. 5 depicts a flow diagram of a process for retrieval of an image from information handling system non-volatile memory to a detachable memory device.

Referring now to FIG. 5, a flow diagram depicts a process for retrieval of an image from information handling system non-volatile memory to a detachable memory device. At step 98, a display is presented that re-imaging is proceeding. At step 100, an image is created on the detachable memory device of the image restore tool stored in the manufacture partition of the hard disk drive of the information handling system. For example, an exact image of the manufacture partition is created and stored on the detachable memory device. In alternative embodiments, alternative methods may be used to store on the detachable memory device a way of creating at the information handling system an image that restores the information handling system to its original factory state. For example, creating an image at the detachable memory device might include executing instructions at the information handling system that analyzes the existing image or that retrieves a factory image from network location. Once an image of the manufacture partition is stored on the detachable memory device at step 100 so that the factory image can be recreated at the information handling system, the process continues to step 102 to create an image on the detachable memory device of the executable at the information handling system that initiates the image restore tool, such as a partition that stores a WinRE operating system. At step 104, the detachable memory device has retrieved all of the information needed to recreate the original manufacture image of the information handling system and the process continues to cleanse the information handling system.

Figure 6:
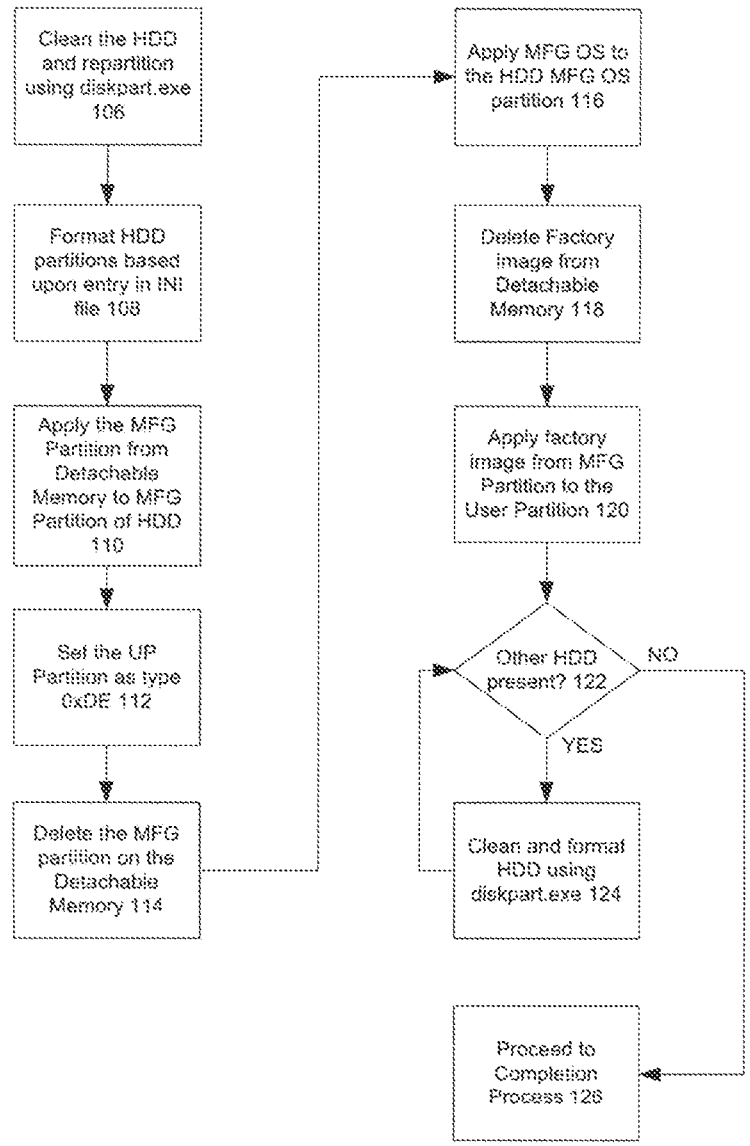
FIG. 6 depicts a flow diagram of a process for cleansing and imaging an information handling system non-volatile memory from a detachable memory device.

Referring now to FIG. 6, a flow diagram depicts a process for cleansing and imaging an information handling system non-volatile memory from a detachable memory device. The process begins at step 106 with cleaning of the information handling system hard disk drive of all information stored on the hard disk drive, such as by performing a bit-by-bit formatting of the entire hard disk drive, and re-partitioning the hard disk drive to match the original manufacture partitions. In alternative embodiments, alternative cleansing techniques may be used, such as erasing decryption information so that information stored on the hard disk drive is effectively unreadable. At step 108, the hard disk drive partitions are formatted. At step 110, information is copied from the detachable memory device to the manufacture partition newly created at the hard disk drive. In one embodiment, the information is an image of the manufacture partition that was saved to the detachable memory device before cleansing the hard disk drive. In an alternative embodiment, the original manufacture image is copied and restored with an image restore tool already available on the detachable memory device or copied to the detachable memory device from the manufacture partition before cleansing of the hard disk drive. At step 112, the manufacture partition is set as type 0xDE. At step 114, the information that was copied to the detachable memory device from the hard disk drive before the cleansing is deleted from the detachable memory device. At step 116, the re-imaging creates the original operating system in the newly-created hard disk drive partition for the user partition and at step 118 is deleted from the detachable memory device. At step 120, the factory image is re-created at the information handling system user partition by executing the re-imaging operating system and image restoration tool at the information handling system. At step 122, a determination is made of whether other hard disk drives are present at the information handling system. If other hard disk drives are present, the process continues to step 124 to clean and format the remaining hard disk drives. Once all hard disk drives are cleaned, the process continues to step 126 for completion and shut down.

Figure 7:
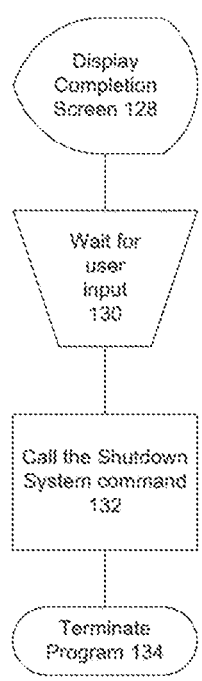
FIG. 7 depicts a flow diagram of a process for completing information handling system image restoration from a detachable memory device.

Referring now to FIG. 7, a flow diagram depicts a process for completing information handling system image restoration from a detachable memory device. At step 128, a completion display is presented. At step 130, an end user acknowledgement is awaited. At step 132, in response to the end user acknowledgement, a shutdown of the system is initiated. In one alternative embodiment, diagnostics may be run at the information handling system before cleansing of the hard disk drive, before shutdown and/or at other times as desired to ensure the information handling system is in proper running condition. Diagnostics can include steps to further cleanse the information handling system back to an original manufacture state, such as by erasing or replacing firmware or clearing error information stored on various integrated circuits or firmware with information handling system 10. At step 134, the cleansing and re-imaging process is terminated.

Although the present invention has been described in detail, it should be understood that various changes, substitutions and alterations can be made hereto without departing from the spirit and scope of the invention as defined by the appended claims.

What is claimed is:

1. A system for copying an image to an information handling system non-volatile memory, the system comprising:
   a detachable memory device having memory and an interface, the interface operable to communicate between the memory and an information handling system;
   a cleanser stored in the detachable memory device and operable to load through the interface to an information handling system to cleanse the information handling system non-volatile memory of information; and
   an imaging tool stored in the detachable memory device and operable to retrieve through the interface to the detachable memory device an image information stored on the information handling system non-volatile memory before the cleanser cleanses the non-volatile memory, the image information capable of re-creating an image of the information handling system, the imaging tool further operable to copy the retrieved image information to the information handling system non-volatile memory after the cleanser cleanse the information handling system non-volatile memory;
   wherein the image information retrieved by the imaging tool comprises a manufacture partition having a restore tool, the restore tool operable run on the information handling system to recreate an image of the information handling system.

2. The system of claim 1 wherein the image information retrieved by the imaging tool comprises an image stored at a network location accessible by the information handling system, the imaging tool retrieving the image from the network location through a network interface of the information handling system.

3. The system of claim 1 wherein the information handling system non-volatile memory comprises a hard disk drive.

4. The system of claim 3 wherein the cleanser comprises instructions to format the hard disk drive.

5. The system of claim 1 wherein the information handling system non-volatile memory comprises a solid state drive.

6. The system of claim 1 wherein the detachable memory device comprises a USB key.

7. The system of claim 1 wherein the imaging tool is further operable to delete the image information from the detachable memory device after the image information is copied to the information handling system non-volatile memory.

8. The system of claim 1 further comprising a diagnostics module stored in the detachable memory device and operable to diagnose the information handling system after the image is copied to the information handling system non-volatile memory.

9. A method for copying an image to an information handling system non-volatile
  memory, the method comprising:
    retrieving image information from the information handling system non-volatile memory to a separate memory device, the image information including a manufacture partition having a restore tool, the restore tool operable run on the information handling system to recreate an image of the information handling system;
    executing a cleanser with instructions from the separate memory device to the information handling system to cleanse the information handling system non-volatile memory of information; and
    copying the image from the separate memory device to the information handling system non-volatile memory with the restore tool.

10. The method of claim 9 further comprising:
  copying a management tool from the separate memory device to the information handling system; and
  executing the management tool at the information handling system, the management tool automatically performing the retrieving an image, the executing a cleanser, and the copying the image.

11. The method of claim 9 wherein the information handling system non-volatile memory comprises a hard disk drive.

12. The method of claim 9 wherein the information handling system comprises a solid state drive.

13. The method of claim 9 wherein executing the cleanser further comprises executing a format of the information handling system non-volatile memory.

14. The method of claim 9 wherein the memory device comprises a USB key.

15. The method of claim 9 further comprising deleting the image from the separate memory device.

16. The method of claim 9 further comprising automatically executing diagnostics at the information handling system before the copying the image from the separate memory device to the information handling system non-volatile memory.

17. An information handling system comprising:
  a processor operable to execute instructions;
  non-volatile memory storing an image information retrieved by the imaging tool comprises a manufacture partition having restore tool, the restore tool operable run on the information handling to recreate an image of the information handling system; and
  a detachable memory device storing instructions operable to execute on the processor to:
    retrieve the image restore information from the non-volatile memory to the detachable memory device, the image restore information operable to restore an image of the information handling system;
    erase the information stored on the non-volatile memory;
    copy the image restore information from the detachable memory device to the non-volatile memory with the image restore tool.

18. The information handling system of claim 17 wherein the detachable memory device instructions are further operable to initiate an image restore tool to restore the image to the non-volatile memory with the image restore information.

19. The information handling system of claim 17 wherein the detachable memory device instructions are further operable to erase the image restore information from the detachable memory device after copying the image restore information to the non-volatile memory.

* * * * *